United States Patent [19]

Dimpfel et al.

[11] 4,416,439

[45] Nov. 22, 1983

[54] ADJUSTABLE LEG ASSEMBLY

[76] Inventors: Fred Dimpfel, 14100 Montfort Dr. #3260, Dallas, Tex. 75240; Steven J. Hahn, 127 Oberlin Ter., Lansdale, Pa. 19446; Brian J. Dyson, 7560 Taylor Rd., Riverdale, Ga. 30274; Sandra F. Doyon, P.O. Box 603, Montross, Va. 22520

[21] Appl. No.: 253,152

[22] Filed: Apr. 10, 1981

[51] Int. Cl.³ .............................................. F16M 11/38
[52] U.S. Cl. ................................ 248/188.6; 248/188.8
[58] Field of Search .................. 248/188.8, 188.6, 166, 248/167; 108/99, 121, 125, 129

[56] References Cited

U.S. PATENT DOCUMENTS

| 574,486 | 1/1897 | Jones | 248/166 |
| 740,459 | 10/1903 | McNaughton | 248/188.6 X |
| 757,766 | 4/1904 | Palmer | 248/188.6 X |
| 1,444,569 | 2/1923 | Starkweather | 248/188.6 X |
| 1,856,805 | 5/1932 | Call | 248/188.8 X |
| 1,891,734 | 12/1932 | Slee | 108/125 X |
| 3,432,131 | 3/1969 | Martin | 248/188.8 |

FOREIGN PATENT DOCUMENTS

| 242564 | 5/1946 | Switzerland | 108/129 |
| 288282 | 3/1928 | United Kingdom | 248/188.6 |

*Primary Examiner*—William E. Lyddane
*Assistant Examiner*—Sarah A. Lechok
*Attorney, Agent, or Firm*—Berman, Aisenberg & Platt

[57] ABSTRACT

An adjustable and extendable leg with nestable segments to provide a choice of lengths. The leg may be pivotably connected to a platform so as to be able to dispose the platform at selected angles and heights with respect to a horizontal support surface.

12 Claims, 9 Drawing Figures

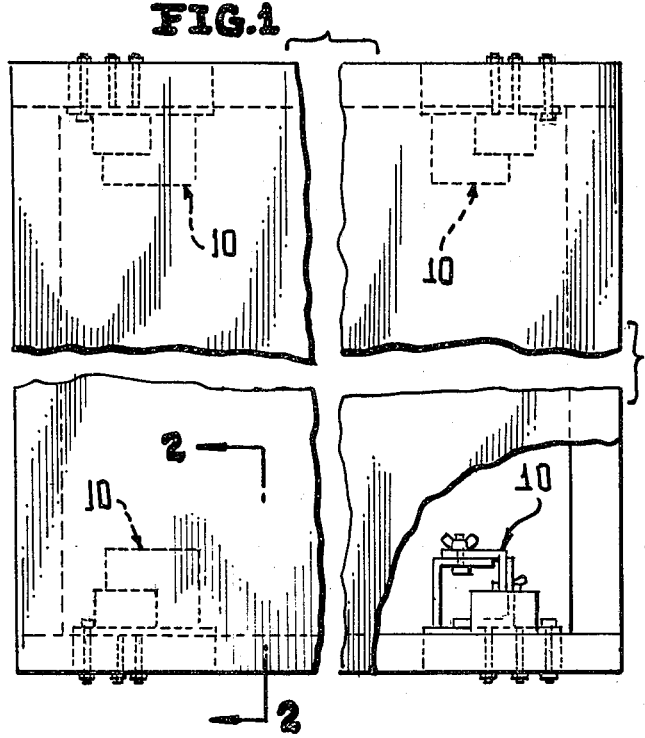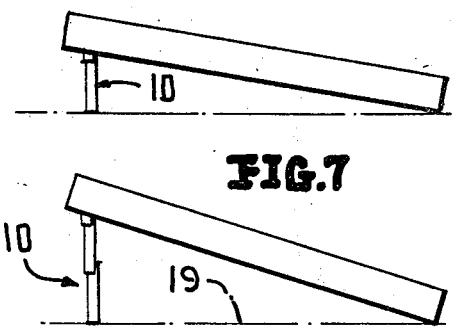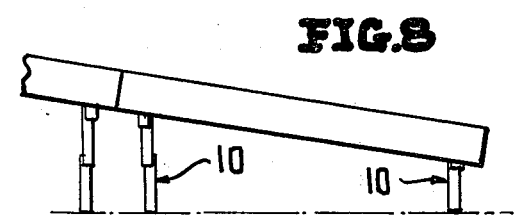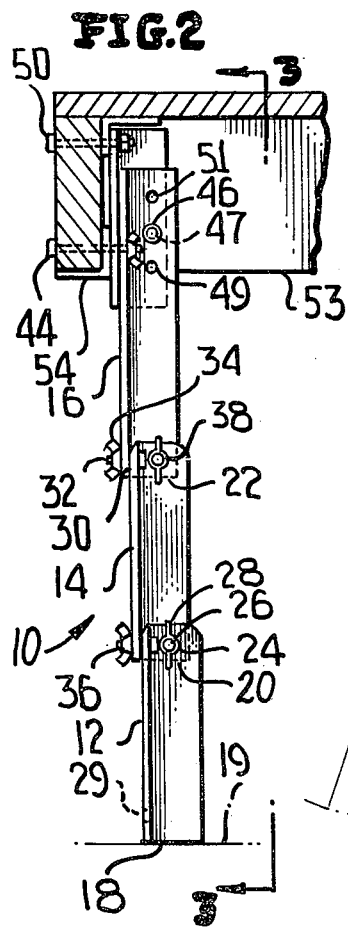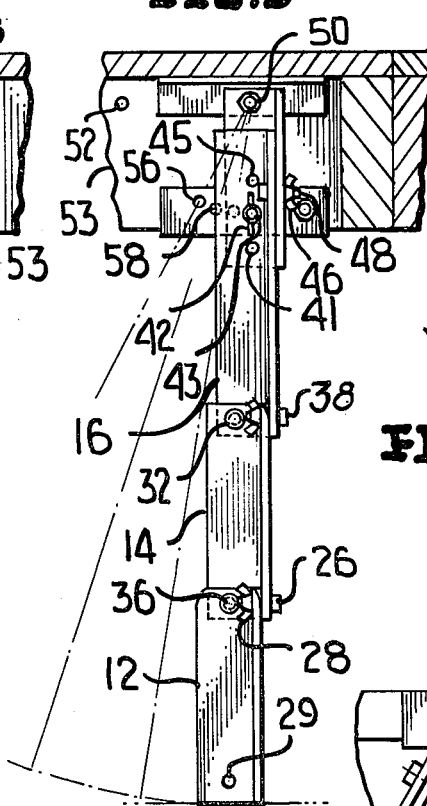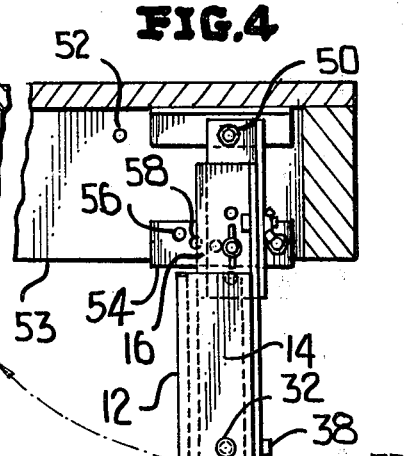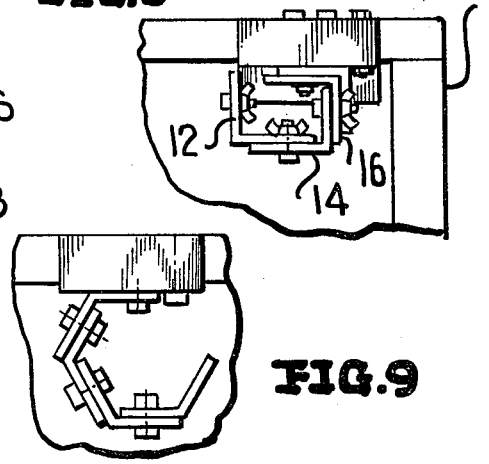

ADJUSTABLE LEG ASSEMBLY

This invention relates to adjustable legs for tables, benches, platforms and the like.

Since it is desirable to have leg supported articles at a range of heights, it is all the more desirable to provide legs which can be easily, quickly, and firmly adjusted for height increments. Many such leg designs are costly to construct and have many removable parts.

Some advantages of this leg are:
(1) Few removable parts to get lost;
(2) Adjustments can be made by hand without tools;
(3) Adjustments are fast and easy;
(4) Low cost and readily available parts.

The leg is comprised of three segments pinned at the ends. This is done in such a manner that each segment can be folded into the one above it, in a compact nested position, thus allowing the height adjustments of the leg. At each level, the leg will be locked in position with pins secured firmly by wing nuts.

It is the primary objective of the present invention to provide a leg assembly which is simple and economical to construct and at the same time will provide a rigid self-bracing, supporting structure. A further objective of the invention is to provide an adjustable leg which is easy to adjust without tools.

With the above objects in view, the invention resides in the novel features of arrangement, form, construction, and the combination of parts to obtain height increments.

Additional objects and features of the invention will become apparent from the following description and with reference to the accompanying drawing in which:

FIG. 1 is a fragmentary top view of a platform with part of the platform removed to better illustrate the present invention in its folded position.

FIG. 2 is an elevation view along line 2—2 in FIG. 1 showing the present invention connected to the frame of the platform in FIG. 1.

FIG. 3 is a side elevation view along line 3—3 in FIG. 2 showing, in phantom line, the various angles of the leg needed for rampling of the platform illustrated in FIGS. 6, 7 and 8.

FIG. 4 again is a side elevation view of the foldable leg shown in its folded position.

FIG. 5 is a bottom view of FIG. 4 illustrating the compact nested components of the leg.

FIG. 6 is a side view of a platform with the adjustable leg at one end.

FIG. 7 shows the platform of FIG. 6 with the adjustable leg partially extended.

FIG. 8 shows the platform of FIG. 6 with adjustable legs at both ends and also showing another adjoining platform to extend the upper surface of the first platform.

FIG. 9 is a bottom view of another embodiment of the foldable leg utilizing a 120° angle to extend the leg to four sections.

For a more detailed description of the invention herein disclosed, reference is made to the drawings in which 10, in FIG. 1, shows a top view of the leg in its folded position. In FIG. 2, the leg 10 is shown in greater detail in its completely extended position. Leg segments or elements 12, 14, 16 are extruded L-shaped angle irons with square corners, connected at their ends by pins 36, 38, wing nuts 34, 28 and bolts 32, 26, through aperture 24, 30 provided in the ends of the angle iron elements.

The fully extended position shown in FIG. 2 has bearing surface 18. When using 90° extruded angle-irons, three different height increments can be obtained utilizing any length necessary for elements 12, 14, 16. The ends of elements 12, 14 have been rounded to allow rotation of elements 12, 14 about pins 36, 38. From the fully extended position of the leg shown in FIG. 2, the first adjustment is obtained by removing wing nut 28 and bolt 26, allowing element 12 to rotate about pin 36 into element 14 through an angle of 180°. Before element 12 can be fully rotated, wing nut 34 and bolt 32 are removed. Aperture 29 can then be matched up with aperture 30, thereby allowing wing nut 34 and bolt 32 to be replaced, securely holding elements 12 and 14 compactly and firmly in place. At this position, elements 12, 14 form a U-shaped bearing surface 20, whereby both elements 12, 14 are in contact with the support surface 19 to hold the load of the leg. The second adjustment can be obtained by rotating elements 12 and 14 180° about pin 38 into element 16 by removing wing nut 34 and bolt 32 and also removing wing nut 48 and bolt 46. After aperture 24 matches up with aperture 47, wing nut 48 and bolt 46 are replaced securely holding elements 14 and 12 in place. Wing nut 34 and bolt 32 are then replaced into apertures 29 and 30 securely holding elements 12 and 14. At this position the bearing surface 22 consists of element 12, 14 and 16 nested together as shown in FIG. 5, allowing the load to be supported by all three elements. The third adjustment can be obtained by rotating leg assembly 10 about pin 50 by removing wing nut 42 and bolt 44. Aperture 52 through frame 53 is then lined up with aperture 43 so that wing nut 42 and bolt 44 can be employed to securely hold the leg assembly in place. This compact position allows the platform to be stored and shipped if necesary. Bearing surface 54 can be utilized in this position to protect the wooden frame 53 from abuse. Adjusting the angle of the leg with respect to the platform to permit the platform to be arranged at a desired angle, as shown in FIG. 3 by phantom line, can be achieved by removing wing nut 42 and bolt 44, rotating the leg about pin 50, and lining up aperture 43 with either 56 or 58. Wing nut 42 and bolt 44 are then replaced to securely hold the leg in place. An additional offset in height for the platform can be obtained by removing wing nut 42, bolt 44, wing nut 47, and bolt 48, and replacing them in the appropriate apertures 49, 51 and 41, 45 to accommodate the joining of two platforms as shown in FIG. 8. FIG. 5 shows the nested position of the leg.

Another embodiment of the invention is shown in FIG. 9 in nested position. This embodiment is substantially the same as the embodiment of FIGS. 1–5 except that the elements 12, 14 and 16 are made from 120° angle irons instead of 90° angle irons. Four height increments can be achieved with this embodiment.

One important use of this invention is in theatrical staging but many other uses will be obvious.

The foregoing disclosure and description of the invention are illustrative and explanatory thereof, and various changes in the size, shape, and materials as well as in the details of the illustrated constructions may be made without departing from the spirit of the invention.

What is claimed is:

1. Adjustable leg assembly for a load supporting member comprising:

a. support means adapted to be connected to said load support member, b. extendable means mounted on and projecting from said support means; said extendable means including a plurality of pivotally connected nestable segments, each of said segments comprising a pair of flat plates disposed at an angle of more than 90° with respect to each other, and c. means for pivotally interconnecting adjacent segments.

2. The adjustable leg assembly of claim 1 wherein each of said pivotally interconnecting means comprises a pin and a fastener.

3. The adjustable leg assembly of claim 2 wherein adjoining ends of adjacent segments are nested with the corresponding pin and fastener extending through the mated portions of said segments.

4. The adjustable leg assembly of claim 3 wherein said fastener and pin are perpendicular with respect to each other.

5. The adjustable leg assembly of claim 1 wherein said support means comprises plate means and a member pivotally mounted thereon.

6. The adjustable leg assembly of claim 5 wherein said member and an adjacent segment are provided with alignable openings and fastening means extending through said openings to permit selective positioning of the member and segment relative to each other.

7. The adjustable leg assembly of claim 5 wherein said plate means and said member are provided with alignable openings and fastening means extending through said openings to hold the member in a selected pivoted position.

8. A load bearing support comprising a horizontally extending main body, at least one adjustable leg assembly depending from said main body, said leg assembly including a plurality of nestable segments, and means for pivotally interconnecting adjacent segments, wherein each of said segments comprises a pair of flat plates disposed at an angle of more than 90° with respect to each other.

9. The support of claim 8, wherein each of said pivotally interconnecting means comprises a pin and a fastener.

10. The support of claim 9, wherein adjoining ends of adjacent segments are nested with the corresponding pin and fastener extending through the mated portions of said segments.

11. The support of claim 10, wherein said fastener and pin are perpendicular with respect to each other.

12. The support of claim 8, and means for pivotally mounting said leg assembly on said main body.

* * * * *